Oct. 30, 1962     P. D. HESS     3,060,706

GATE DAMPING DEVICE

Filed April 27, 1960

Inventor
Paul D. Hess
By Arthur M. Streich
Attorney 3,060,706
GATE DAMPING DEVICE
Paul D. Hess, Brookfield, Wis., assignor to Allis-Chalmers
Manufacturing Company, Milwaukee, Wis.
Filed Apr. 27, 1960, Ser. No. 24,951
7 Claims. (Cl. 64—28)

This invention relates in general to hydraulic turbines, and in particular to hydraulic reaction turbines of the Francis and propeller type and also to pump turbine units.

Hydraulic turbines of the Francis and propeller types are provided with a series of revolvable wicket gates arranged around an impeller runner to control and guide water flow through the turbine and against the runner, thereby spinning the runner to generate power.

Each wicket gate is linked by an individual control linkage to a control ring which when turned simultaneously actuates all gates and positions them to control the power output of the turbine.

A wicket gate's movement may be restricted by an obstruction, that is, debris may at times enter the turbine intake and be carried to the turbine where it may block movement of the wicket gates. It is therefore the practice to avoid damage and possible destruction of the control linkage by providing a shear pin to release the wicket gate from this linkage. As a gate released from its linkage is free to rotate, stops have been provided to limit such rotation, thereby preventing interference and damage to the neighboring gates.

It has been found that the water force acting upon a gate free from its control linkage will cause the gate to vibrate and flutter, sometimes slamming the gate against the stops. The resulting momentum of the gate, which is a product of rotational velocity times the large mass comprising the gate, is at times of such extreme magnitude that the stops are either bent over and wedged under the gate or broken off completely. In some cases where larger stops have been utilized, the momentum has caused the main shaft of the wicket gate to be twisted out of shape.

As the magnitude of the revolving gate's momentum is such that the gate and its stops may be damaged, it is an object of this invention to control the momentum and prevent such damage.

It is an object of this invention to provide a motion damping device that retards flutter and vibration of a gate which is loose from the central control.

It is also an object of this invention to provide a brake or damping device which will automatically function to retard a wicket gate from slamming against its stops whenever breakage of a shear pin releases a wicket gate from its control linkage.

Another object of this invention is to provide a brake or damping device which operates only after the shear pin has severed so as not to have an effect on the safety function of the shear pin.

According to one preferred embodiment of the present invention, the wicket gate and a first lever are secured to a shaft. A second lever, which is linked to the central control ring, is loosely connected to the shaft allowing relative motion between this second lever and the shaft. Both levers are adjacent and in register to each other in order to allow interconnection by means of a shear pin and thereby complete the linkage between the wicket gate and control ring for normal operation. This arrangement is conventional in the art and the invention consists of providing a brake or damping device to frictionally retard relative motion occurring between the levers after the shear pin has severed. The invention is accomplished in a preferred embodiment by attaching to the first lever a brake mechanism which produces a force to urge a shoe in the direction of the second or both levers. However, as long as the levers are aligned in their normal position, the brake mechanism does not apply any force to the second lever so that it does not in effect provide reinforcement for the shear pin unless it was desired to also use a weaker shear pin. It is not desired that a greater force be required to disengage the linkage and further if that were the desire it would be much simpler to use a stronger shear pin alone. However, according to the preferred embodiment the second lever has one or more steps or inclined planes so located that when the levers are in a normal aligned position an equal number of steps or planes lie on oppositely disposed sides of the braking mechanism. Severing of the shear pin will allow relative motion between the levers and cause a step or inclined plane to engage the brake shoe and move the shoe against the bias of the brake mechanism so its force may be applied to both levers and thereby frictionally retard further relative motion between the levers.

Objects and advantages other than those above set forth will be apparent from the following description when read in connection with the accompanying drawings.

Figure 1:
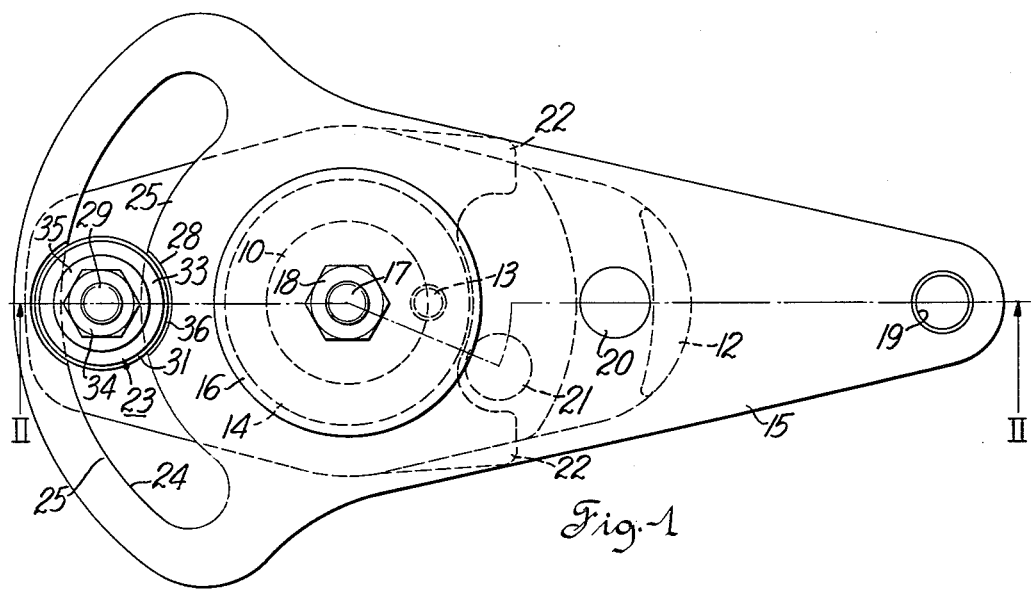
FIG. 1 is a plan view of wicket gate actuating levers which have been provided with a damping device.

Referring to the drawings, a shaft 10, free to rotate about its axis within turbine housing 11, is provided for each wicket gate (not shown) so that each gate may be rotated and positioned for maximum efficiency.

A first member or arm rotatable about the axis is shown in the drawing as gate lever 12 which receives the shaft 10 and is coupled to the shaft by a key 13, thereby enabling rotational movement of the gate lever 12 about the axis of the shaft 10 to rotate the shaft. The gate lever 12 may as illustrated include a ring portion 14 which concentrically surrounds the upper end of the shaft 10.

A second member or arm, illustrated by shear lever 15, is also connected to the shaft 10 for rotation about the axis of the shaft. However, the shear lever 15 is free to rotate with respect to the shaft 10 and attached gate lever 12. In this embodiment the shear lever 15 loosely reecives the ring portion 14 as an axle about which it can rotate. As shown the shear lever 15 may be contained on the ring portion 14 by providing a hubcap 16 which has been secured to the shaft 10 by stud 17 and nut 18. The shear lever 15 is pivotally linked at pivot bore 19 to a central control ring (not shown) and thereby provides a connection between the control ring and the shaft 10.

A yieldable fastening means such as a shear pin 20 is provided to connect the gate lever 12 to the shear lever 15 and prevent relative motion between them. Therefore, any motion sent by the central control ring to the shear lever 15 is transmitted through the shear pin 20 to the gate lever 12, thereby enabling the gate lever to rotate the shaft 10. In the event that rotation of the wicket gate becomes restricted, the shear pin 20 will sever to release the gate from the central control ring. However, as the gate will then be free to spin and interfere with the neighboring gates, stops must be provided to limit the rotation of the gate. In this case a gate stop 21 is provided to engage one of the stop lugs 22 on the gate lever 12 and thereby limit such rotation.

Figure 2:
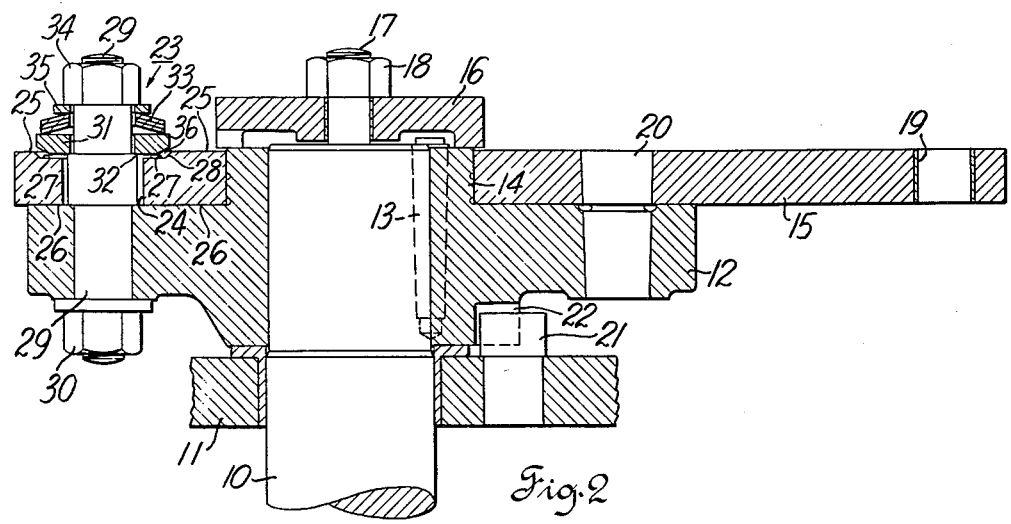
FIG. 2 is a sectional view taken in the direction of line II—II of FIG. 1 showing the actuating levers in section, together with a damping mechanism, a shear pin, a gate stop, a portion of a wicket gate shaft, and a partial section of a hydraulic turbine housing.

A braking means is provided to control the velocity of the freely rotating wicket gate and prevent any damage which may be caused by slamming of the gate lever 12 against the stop 21. A preferred embodiment of the braking means is indicated generally at 23. A curved slot 24 provided between the opposed first face 25 and a second face 26 of the shear lever 15 defines an arc spaced radially and equally from the central axis of the shaft 10. First face portion 25 is countersunk to provide a recess surface 27 on both sides of the slot 24 at its midportion. As shown, chamfered edge 28 connects the recess surface 27 with the first face portion 25 of the shear lever 15 and thereby provides an incline plane between these two surfaces 27 and 25. A rod 29 is connected by nut 30 to the gate lever 12 and projects through the slot 24. In normal operation with the shear pin 20 joining the levers 12 and 15, the rod 29 will be located to project through the midportion of the slot 24 and between the two portions of the recessed surface 27 as shown in the drawings. Any relative motion between the shear lever 15 and the gate lever 12 will also cause a corresponding motion of the rod 29 relative to the slot 24. A saucer shaped brake shoe 31 circumscribes the rod 29 and slides longitudinally downward to rest on shoulder 32 which has been provided on the rod 29. As shown in FIG. 2, the lower edge of the brake shoe 31 may be beveled and thereby provide an inclined plane for lifting the shoe 31. Biasing means are provided by the Belleville springs 33 circumscribing the rod 29 and adjoining the shoe 31. Nut 34 together with washer 35 secure the Belleville spring 33 and brake shoe 31 on the rod 29. By adjustably tightening the nut 34, the Belleville springs 33 are compressed to produce a desired spring load urging the brake shoe 31 downward in the direction of the shoulder 32. Normally, when the levers 12, 15 are adjoined by the shear pin 20, the brake shoe 31 will occupy cavity 36 formed between the recessed surface 27 and the first face 25 of the shear lever 15. While in the cavity 36 the lower surface of the brake shoe 31 will be at a level below the first face 25 but will be prevented from contacting the recess surface 27 by the shoulder 32. Therefore, in normal operation of the gate, there is no contact between the shear lever 15 and the brake shoe 31.

Operation of the described braking means is brought about whenever an obstruction jams movement of the gate and causes the shear pin 20 to sever. Relative motion between the levers 12 and 15 causes the rod 29, which carries the brake shoe 31, to move relative to the slot 24 thereby moving the brake shoe 31 away from its position in cavity 36. The brake shoe 31 after traveling a short distance in either direction will engage the shear lever 15 at a chamfered edge 28. The chamfered edges 28 provide a pair of inclined planes which engage the shoe 31 as it moves past. As the shoe 31 climbs the incline it will be lifted off the shoulder 32 and onto the shear lever 15. The Belleville springs 33 being further compressed produce a heavy spring load forcing the brake shoe 31 against the shear lever 15 causing a friction force. The friction force will increase uniformly as the shoe 31 climbs the incline. When the shoe 31 bears on the face 25 of the shear lever 15, the frictional force will be at a maximum and will retard further relative motion between the levers 12 and 15.

Replacement of the severed shear pin is easily accomplished by loosening nut 34 to release the spring load. The levers 12, 15 are then easily realigned enabling a new shear pin to be dropped into place.

Although a single embodiment of the present invention has been illustrated and described, it will be apparent to those skilled in the art that various changes and modifications may be made therein without departing from the spirit of the invention or from the scope of the appended claims.

Having now particularly described and ascertained the nature of my said invention and the manner in which it is to be performed, I declare that what I claim is:

1. A motion damping device comprising: a first member rotatable about an axis; a second member rotatable about said axis; yieldable force transmitting means connecting said first and second members to hold said members against relative movement, said yieldable means permitting relative movement between said members when the force transmitted therebetween has reached a predetermined amount; a rod attached to said first member; braking means connected to said rod and movable axially on said rod; and biasing means engaging said rod and said braking means and urging said braking means toward said second member, said braking means located with respect to said second member as to be movable into frictional engagement with said second member after a predetermined amount of relative movement between said members, said braking means offering resistance to however permitting relative movement between said first and second members.

2. A motion damping device comprising: a first member rotatable about an axis; a second member rotatable about said axis; yieldable force transmitting means connecting said first and second members to hold said members against relative movement, said yieldable means permitting relative movement between said members when the force transmitted therebetween has reached a predetermined amount; a rod attached to said first member; braking means connected to said rod and movable axially on said rod; and biasing means engaging said rod and said braking means urging said braking means toward said second member, said second member having an inclined surface, said braking means being located with respect to said inclined surface as to be movable into frictional engagement with said surface after a predetermined amount of relative movement between said members, said braking means offering resistance to however permitting relative movement between said first and second members.

3. A motion damping device comprising: a first member rotatable about an axis; a second member rotatable about said axis; a yieldable fastening means connecting said first member to said second member and preventing relative motion between said first member and said second member; a rod attached to said first member; a braking shoe connected to said rod and movable axially on said rod; annular biasing means circumscribing said rod engaging said rod and said braking shoe urging said shoe toward said second member, said second member having a pair of inclined surfaces forming a pair of inclined planes, said braking shoe being located with respect to said second member to be between said inclined planes; and movement of said members relative to each other about said axis shearing said fastening means and thereby engaging said shoe with one of said inclined planes to lift said shoe against the urging of said biasing means and apply an increasing frictional drag and damping action to continuing relative motion of said members in the same direction.

4. A motion damping device comprising: a first arm rotatable about an axis; a second arm rotatable about said axis, said second arm being spaced along said axis relative to said first arm; a shear pin connecting said first arm to said second arm and preventing relative motion between said first arm and said second arm, said second arm having a slot defining an arc radially and equally spaced from said axis; a rod attached to said first arm and projecting through said slot; braking means attached to said rod on the side of said second arm opposite the side facing said first arm, said braking means being movable axially on said rod; and annular biasing means around said rod and between said braking means and the end of said rod, said biasing means urging said braking means along said rod into frictional engagement with said second arm when said shear pin severs, said braking means offering resistance to however permitting relative movement between said first and said second arms.

5. A motion damping device comprising: a first arm rotatable about an axis; a second arm rotatable about said axis, said second arm being spaced along said axis relative to said first arm; a shear pin connecting said first arm to said second arm and preventing relative motion between said first arm and said second arm, said second arm having a recess and a slot; a rod attached to said first arm and projecting through said slot; a braking shoe attached to said rod and axially movable on said rod, said shoe being positioned within said recess; a shoulder on said rod supporting said braking shoe to prevent contact between said shoe and said recess; and a yieldable biasing means urging said braking shoe to engage said second arm when said relative motion causes said shear pin to sever and transports said braking shoe without said recess enabling said shoe to apply a frictional drag and damping action to continuing relative motion between said arms.

6. A motion damping device comprising: a first member rotatable about an axis; a second member rotatable about said axis; yieldable force transmitting means connecting said first and second members to hold said members against relative movement, said yieldable permitting relative movement between said members when the force transmitted therebetween has reached a predetermined amount; and braking means associated with said members offering resistance to however permitting relative movement between said members after said force has exceeded said predetermined amount.

7. A motion damping device comprising: a first arm rotatable about an axis; a second arm rotatable about said axis; walls defining an arcuate slot through said second arm, the center of curvature of said slot being said axis, the surface of said second member remote from said first member having a pair of oppositely disposed inclined planes with a recess at the midportion thereof, said inclined planes extending along the border of said slot and said recess being disposed in the border of the midportion of said slot; a rod attached to said first arm and projecting through said slot; braking means attached to said rod and axially movable thereon; biasing means connected to said rod and said braking means and urging said braking means toward said surface of said second member; and an annular shoulder around said rod axially located along said rod to engage said braking means and limit movement thereof in the direction urged by said biasing means to prevent contact between said braking means and said second arm when said rod is located at said midportion of said slot, said braking means engaging one of said inclined planes and offering resistance to however permitting relative movement between said members after a predetermined amount of relative motion therebetween.

References Cited in the file of this patent

UNITED STATES PATENTS

| | | |
|---|---|---|
| 194,669 | Gidley | Aug. 28, 1877 |
| 1,464,905 | Grafenstatt | Aug. 14, 1923 |
| 1,609,716 | Holden | Dec. 7, 1926 |
| 2,094,584 | Cox | Oct. 5, 1937 |
| 2,541,827 | Mosso et al. | Feb. 13, 1951 |

UNITED STATES PATENT OFFICE

CERTIFICATE OF CORRECTION

Patent No. 3,060,706            October 30, 1962

Paul D. Hess

It is hereby certified that error appears in the above numbered patent requiring correction and that the said Letters Patent should read as corrected below.

Column 5, line 19, after "yieldable" insert -- means --.

Signed and sealed this 2nd day of April 1963.

(SEAL)
Attest:

ESTON G. JOHNSON            DAVID L. LADD
Attesting Officer            Commissioner of Patents